United States Patent [19]
Richards

[11] 3,823,472
[45] July 16, 1974

[54] GRASS CATCHER FOR LAWN TRIMMING SHEARS

[75] Inventor: Ronald A. Richards, Victoria, British Columbia, Canada

[73] Assignee: The Raymond Lee Organization, Inc., New York, N.Y.

[22] Filed: June 8, 1973

[21] Appl. No.: 368,114

[52] U.S. Cl. .................................. 30/131, 56/202
[51] Int. Cl. ............................................ B26b 13/22
[58] Field of Search ............ 30/131, 132, 133, 124; 56/202, 241

[56] References Cited
UNITED STATES PATENTS

| | | | |
|---|---|---|---|
| 1,338,873 | 5/1920 | Scott | 30/131 |
| 3,212,186 | 10/1965 | Frauenheim | 30/131 |

FOREIGN PATENTS OR APPLICATIONS

| | | | |
|---|---|---|---|
| 26,133 | 11/1910 | Great Britain | 30/131 |
| 106,040 | 5/1917 | Great Britain | 56/202 |
| 323,161 | 12/1929 | Great Britain | 30/131 |
| 358,943 | 10/1931 | Great Britain | 56/202 |
| 748,967 | 5/1956 | Great Britain | 30/131 |

*Primary Examiner*—Al Lawrence Smith
*Assistant Examiner*—J. C. Peters

[57] ABSTRACT

A device adapted for use with a lawn trimming shears having horizontal shears and an elongated inclined handle. A bottom horizontal elongated plate having a longitudinally extending guide on top is disposed under the shears with the bottom blade along the guide. Vertical parallel side members extend upwards from opposite sides of the plate. One member extends upward only a short distance and has a plurality of horizontally aligned spaced slots. An elongated bar is pivotally secured at its bottom end to the inside of the plate at one or another of the holes. The bar is removably secured to the handle.

4 Claims, 3 Drawing Figures

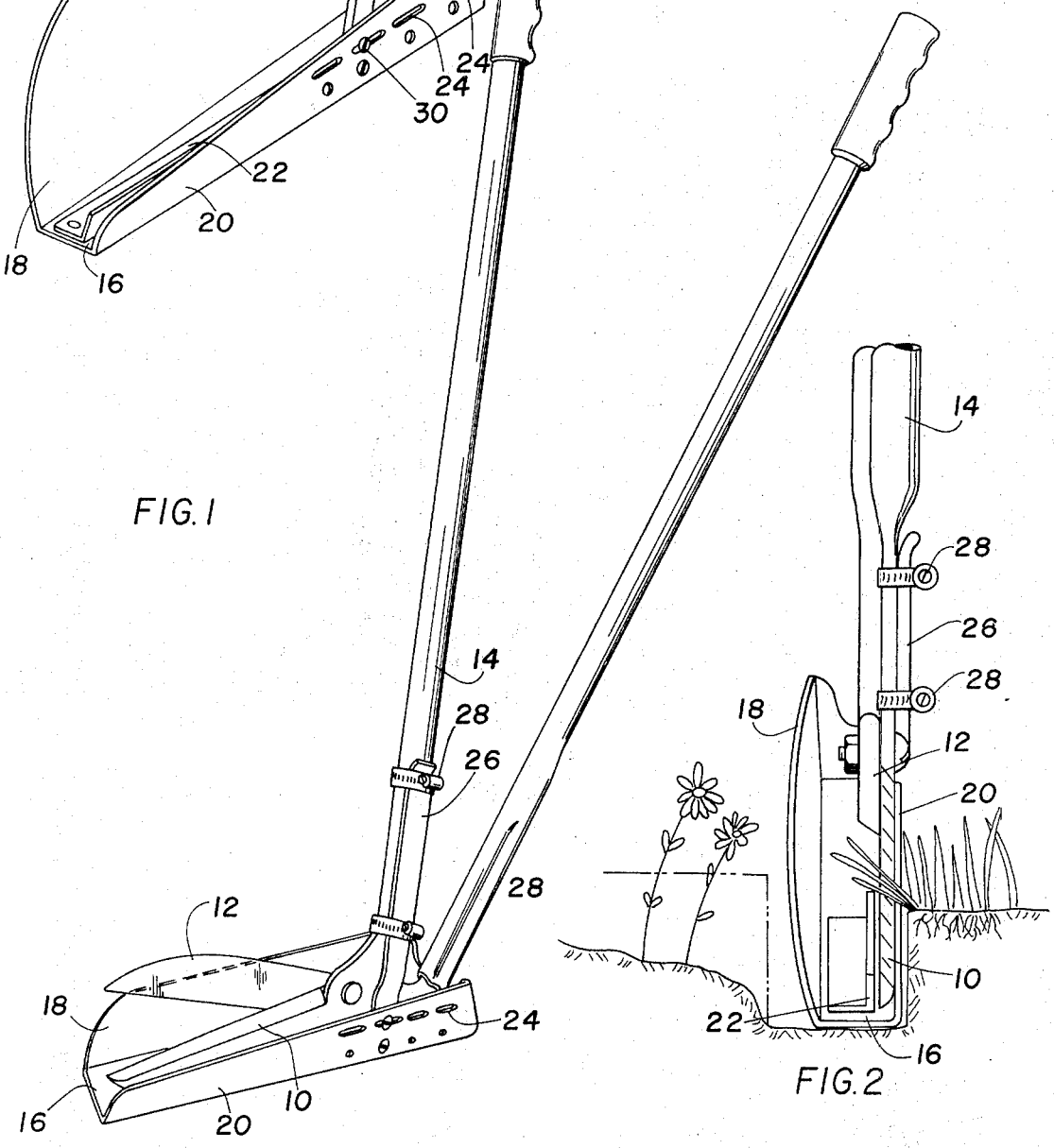

GRASS CATCHER FOR LAWN TRIMMING SHEARS

SUMMARY OF THE INVENTION

My invention is directed toward an attachment for lawn trimming shears which enables a user to stand erect to trim edges of the lawn along flower beds and borders and at the same time to pick up the trimmings without kneeling, raking, sweeping or hand picking.

To this end, the shears employs horizontal shears operated by an inclined elongated handle extending outward and upward therefrom.

My attachment includes a horizontally elongated horizontal plate having an elongated guide extending longitudinally along the top surface. The plate is disposed underneath the shears with the bottom blade engaged by the guide.

Two opposite parallel vertical side members are secured to the corresponding sides of the plate and extend upward. One side member is relatively high. The other member extends upward only a relatively short distance and is provided with a plurality of horizontally aligned spaced horizontal openings. An elongated bar is pivotally secured at a lower end to the inside of the other member at one or another of the openings. The bar is detachably secured to the handle.

When the shears cuts grass, the clippings are collected between the side members and rest on the plate whereby subsequent easy removal ensues.

BRIEF DESCRIPTION OF THE DRAWINGS

In the drawings:

FIG. 1 is a perspective view of my invention ready for use;

FIG. 2 is a cross section showing, in vertical end view, my invention in use; and FIG. 3 is a perspective view of the attachment without the shears.

DETAILED DESCRIPTION OF PREFERRED EMBODIMENTS

Referring now to FIGS. 1–3, horizontal shears have a fixed bottom blade 10 and a pivotable top blade 12 operated in conventional manner by elongated inclined handle 14.

A flat horizontal elongated plate 16 has integral vertical parallel side members 18 and 20 which extend upward from opposite sides of the plate. [Member 18 can be somewhat curved rather than exactly vertical if desired].

Member 18 is relatively high and extends generally above the shears. Member 20 is quite shallow and exposes the cutting edge of the bottom blade.

Longitudinally extending along the top of plate 16 is a guide 22 which is engaged by the side of the horizontal blade.

Member 20 has a plurality of spaced horizontally aligned horizontally elongated transverse slots or openings 24.

An elongated bar 26 is pivotally secured at 30 to the inner surface of member 20 at one or another of the holes. Clamps 28 detachably secure the bar to the handle whereby the invention can be used as described.

Depending upon the shear and handle geometry one or another of the slots is used to secure the bar in proper position to be secured to the handle.

While I have described my invention with particular reference to the drawings, such is not to be considered as limiting its actual scope.

Having thus described this invention, what is asserted and claimed as new is:

1. A gardening device comprising:
   an elongated flat horizontal plate;
   first and second vertical parallel sides each secured to the corresponding side of the plate and extending upward therefrom, the first vertical side being relatively high, the second vertical side extending upward only a short distance from the plate, said second vertical side having a plurality of horizontally aligned space openings extending therethrough;
   an elongated bar extending generally upward; and
   means detachably and pivotally securing the lower end of the bar to the inner surface of the second vertical side at one of the openings.

2. The device of claim 1 wherein a horizontally elongated shear blade receiving guide is secured to the top surface of the plate and extends therealong.

3. The device of claim 2 wherein a horizontal shears has a vertically inclined elongated control handle, the bottom blade of the shears being disposed along the guide and further including means detachably securing said bar to said control handle.

4. The device of claim 3 wherein said openings are horizontally elongated.

* * * * *